(12) United States Patent
Li et al.

(10) Patent No.: US 12,593,373 B2
(45) Date of Patent: Mar. 31, 2026

(54) DISCONTINUOUS RECEPTION CONFIGURATION METHOD AND DEVICE

(71) Applicant: VIVO MOBILE COMMUNICATION CO., LTD., Dongguan (CN)

(72) Inventors: Dongru Li, Dongguan (CN); Xueming Pan, Dongguan (CN); Xiaodong Sun, Dongguan (CN); Xiaohang Chen, Dongguan (CN); Wei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 489 days.

(21) Appl. No.: 18/111,473

(22) Filed: Feb. 17, 2023

(65) Prior Publication Data

US 2023/0199907 A1 Jun. 22, 2023

Related U.S. Application Data

(63) Continuation of application No. PCT/CN2021/113739, filed on Aug. 20, 2021.

(30) Foreign Application Priority Data

Aug. 20, 2020 (CN) .......................... 202010845317.0

(51) Int. Cl.
*H04W 76/28* (2018.01)
*H04L 67/131* (2022.01)

(52) U.S. Cl.
CPC ........... *H04W 76/28* (2018.02); *H04L 67/131* (2022.05)

(58) Field of Classification Search
CPC .... H04W 76/28; H04W 76/38; H04L 67/131; Y02D 30/70
See application file for complete search history.

(56) References Cited

U.S. PATENT DOCUMENTS

| | | | | | |
|---|---|---|---|---|---|
| 10,206,091 | B2 | 2/2019 | Ryu et al. | | |
| 2010/0035624 | A1* | 2/2010 | Tseng | .................... | H04W 76/28 370/328 |
| 2019/0223035 | A1* | 7/2019 | You | ........................ | H04W 72/21 |
| 2020/0245395 | A1* | 7/2020 | Zhang | ................... | H04L 5/0053 |
| 2020/0337110 | A1* | 10/2020 | Kim | ...................... | H04W 76/28 |
| 2021/0136689 | A1* | 5/2021 | Kim | ...................... | H04W 24/08 |
| 2021/0250980 | A1* | 8/2021 | Xue | ................. | H04W 52/0216 |

(Continued)

FOREIGN PATENT DOCUMENTS

| | | |
|---|---|---|
| CN | 101651530 A | 2/2010 |
| CN | 109565695 A | 4/2019 |
| CN | 110971474 A | 4/2020 |

(Continued)

OTHER PUBLICATIONS

3GPP TSG-RAN2 #101; R2-1801758; Source: OPPO, APT, Qualcomm, Huawei, HiSilicon; Title: UE behaviour on DRX timer operation; Athens, Greece, Feb. 26-Mar. 2, 2018 (Year: 2018).*

(Continued)

*Primary Examiner* — Mohammed S Chowdhury
(74) *Attorney, Agent, or Firm* — The Webb Law Firm

(57) ABSTRACT

A discontinuous reception configuration method includes: starting or restarting a first timer; and suspending running of the first timer in a case that a time unit corresponding to the first timer does not meet a first condition.

19 Claims, 8 Drawing Sheets

| D | D | U | U | D | S | D | D | S | U | U | D | S | D | D |
|---|---|---|---|---|---|---|---|---|---|---|---|---|---|---|

Backward offset

DRX cycle

Start time of a DRX inactivity timer before adjustment (subframe boundary)

Start time of a DRX inactivity timer after adjustment (subframe boundary)

(56)          References Cited

U.S. PATENT DOCUMENTS

2022/0015185 A1 *   1/2022   Jiang ................. H04W 52/0274
2022/0060985 A1 *   2/2022   Xu .................... H04W 52/0229

FOREIGN PATENT DOCUMENTS

CN          111148193  A      5/2020
EP            2921026  B1    10/2018
JP          2017529763  A    10/2017

OTHER PUBLICATIONS

3GPP TSG-RAN WG2 Meeting #111 electronic; R2-2007897;
Title: Correction to not (re)starting drx-InactivityTimer when dynamic
grant is skipped; Source to WG: MediaTek; Online, Aug. 17-28,
2020 (Year: 2020).*

* cited by examiner

Network side device

11

11

Terminal device

Terminal device

Start or restart a first timer — 201

Suspend running of the first timer in a case that a time unit corresponding to the first timer does not meet a first condition — 203

DISCONTINUOUS RECEPTION CONFIGURATION METHOD AND DEVICE

CROSS-REFERENCE TO RELATED APPLICATIONS

This application is a Bypass Continuation Application of PCT/CN2021/113739 filed Aug. 20, 2021, and claims priority to Chinese Patent Application No. 202010845317.0 filed Aug. 20, 2020, the disclosures of which are hereby incorporated by reference in their entireties.

BACKGROUND OF THE INVENTION

Field of the Invention

The present application relates to the communications field, and in particular, to a discontinuous reception (DRX) configuration method and a device.

Description of Related Art

Extended reality (XR) refers to all real and virtual combined environments and human-computer interactions generated by computer technologies and wearable devices, and includes representative forms such as augmented reality (AR), mixed reality (MR), virtual reality (VR), and interpolated areas therebetween.

In an XR service model, service packets arrive at equal and relatively small intervals. In addition, XR services have high requirements on delays, and packet delay budget (PDB) of an air interface is required to be around 10 ms. Therefore, a discontinuous reception (DRX) cycle of the XR service requires a smaller configuration. In the case of a very small DRX cycle configuration, a data packet may arrive in a sleep state and have no opportunity of being scheduled by a physical downlink control channel (PDCCH) for transmission or sending. As a result, the data packet exceeds PDB and is discarded and user experience rates and system throughputs are greatly decreased.

SUMMARY OF THE INVENTION

According to a first aspect, a discontinuous reception DRX configuration method is provided, performed by a terminal device. The method includes: starting or restarting a first timer; and suspending running of the first timer in a case that a time unit corresponding to the first timer does not meet a first condition.

According to a second aspect, a discontinuous reception DRX configuration apparatus is provided. The apparatus includes: a start or restart module, configured to start or restart a first timer; and a processing module, configured to: in a case that a time unit corresponding to the first timer does not meet a first condition, suspend running of the first timer.

According to a third aspect, a terminal device is provided, including: a memory, a processor, and programs or instructions stored in the memory and executable on the processor, and when the programs or instructions are executed by the processor, steps of the method in the first aspect are implemented.

According to a fourth aspect, a discontinuous reception DRX configuration method is provided, performed by a network-side device. The method includes: configuring a first timer; and sending configuration information, where the configuration information is used to instruct the terminal device to suspend running of the first timer in a case that a time unit corresponding to the first timer does not meet a first condition after the first timer is started or restarted.

According to a fifth aspect, a discontinuous reception DRX configuration apparatus is provided. The apparatus includes: a configuration module, configured to configure a first timer; and a sending module, configured to send configuration information, where the configuration information is used to instruct the terminal device to suspend running of the first timer in a case that a time unit corresponding to the first timer does not meet a first condition after the first timer is started or restarted.

According to a sixth aspect, a network-side device is provided, including a memory, a processor, and programs or instructions stored in the memory and executable on the processor, and when the programs or instructions are executed by the processor, steps of the method in the fourth aspect are implemented.

According to a seventh aspect, a non-transitory readable storage medium is provided, storing programs or instructions, where when the programs or instructions are executed by the processor, steps of the method in the first aspect are implemented, or when the programs or instructions are executed by the processor, steps of the method in the fourth aspect are implemented.

According to an eighth aspect, a computer program product is provided, and the computer program product includes a processor, a memory, and programs or instructions stored in the memory and executable on the processor, where when the programs or instructions are executed by the processor, steps of the method in the first aspect are implemented, or when the programs or instructions are executed by the processor, steps of the method in the fourth aspect are implemented.

According to a ninth aspect, a chip is provided, where the chip includes a processor and a communications interface, the communications interface is coupled to the processor, and the processor is configured to run programs or instructions of a terminal device or a network-side device to implement steps of the method in the first aspect or steps of the method in the fourth aspect.

BRIEF DESCRIPTION OF THE DRAWINGS

The accompanying drawings described herein are used for providing a further understanding of the present application, and form part of the present application. Exemplary embodiments of the present application and descriptions thereof are used for explaining the present application, and do not constitute any inappropriate limitation to the present application. In the accompanying drawings.

DESCRIPTION OF THE INVENTION

The technical solutions in the embodiments of the present application are clearly described below with reference to the accompanying drawings in the embodiments of the present application. Apparently, the described embodiments are merely some rather than all of the embodiments of the present application. All other embodiments obtained by a person of ordinary skill in the art based on the embodiments of the present application shall fall within the protection scope of the present application.

In the specification and claims of the present application, terms "first" and "second" are used to distinguish similar objects, but are not used to describe a specific sequence or order. It may be understood that the data used in such a way is interchangeable in proper circumstances, so that the embodiments of the present application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "I" generally indicates an "or" relationship between associated objects.

It should be noted that, the technology described in this embodiment of the present application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in this embodiment of the present application are often used interchangeably, and the described technologies may be used both for the systems and radio technologies mentioned above and may also be used for other systems and radio technologies. However, the following descriptions describe a new radio (NR) system for the objective of being used as an example, and NR terms are used in most of the descriptions below. These technologies may also be applied to applications other than NR system applications, such as a 6th generation (6G) communication system.

Figure 1:
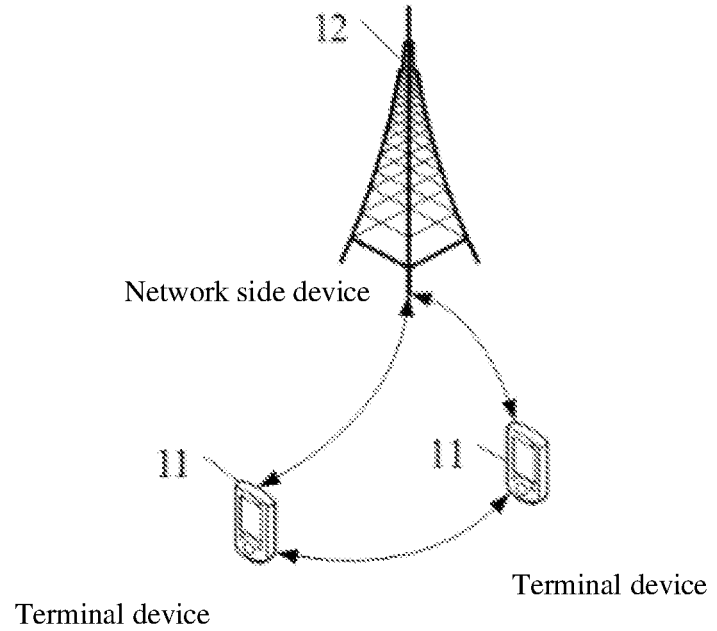
FIG. 1 is a block diagram of a wireless communication system to which an embodiment of the present application is applicable.

FIG. 1 is a block diagram of a wireless communication system to which an embodiment of the present application may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device or vehicle UE (VUE), and pedestrian UE (PUE). The wearable device includes: a bracelet, headphones, glasses, or the like. It is to be noted that, in this embodiment of the present application, a specific type of the terminal 11 is not limited. The network-side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolution node B (eNB), a household node B, a household evolution node B, a WLAN access point, a WiFi node, a transmitting receiving point (TRP), a serving cell, a cell, or some other proper terms in the field. Provided that the same technical effect is achieved, the base station is not limited to a specific technical vocabulary. It should be noted that, in this embodiment of the present application, only a base station in the NR system is used as an example, but a specific type of the base station is not limited.

The discontinuous reception DRX configuration method provided by the embodiments of the present application will be described in detail below with reference to the accompanying drawings through specific embodiments and application scenarios thereof.

Figure 2:
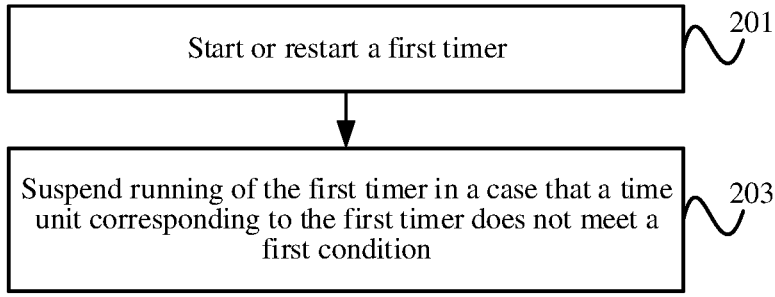
FIG. 2 is a schematic flowchart of a discontinuous reception DRX configuration method according to an embodiment of the present application.

Referring to FIG. 2, an embodiment of the present application provides a discontinuous reception DRX configuration method, executed by a terminal device. The method includes the following process steps.

Step 201: Start or restart a first timer.

A condition for triggering starting or restarting the first timer includes, but is not limited to at least one of the following: periodically starting the first timer at a start time of a DRX cycle; or starting or restarting the first timer in a first symbol after receiving a PDCCH indicating a new transmission. A specific triggering condition is not limited herein.

Step 203: Suspend running of the first timer in a case that a time unit corresponding to the first timer does not meet a first condition.

The suspending running of the first timer may also be referred to as suspending the first timer. This can be understood as that the first timer performs neither a decreasing operation (that is, performs neither a time decreasing operation) nor an increasing operation. The decreasing operation may refer to decreasing by a time unit.

In addition, the suspending running of the first timer refers to suspending running of the first timer in a time unit that does not meet the first condition. A start time of suspending running of the first timer is a start time of the time unit that does not meet the first condition.

Optionally, step 203 may include: in a case that the time unit corresponding to the first timer is a flexible time unit, suspending running of the first timer in the flexible time unit.

In an embodiment, the first condition includes: the time unit is a downlink time unit and the time unit is a flexible time unit. In a case that the time unit corresponding to the first timer is not a downlink time unit or a flexible time unit, running of the first timer is suspended.

In another embodiment, the first condition includes: the time unit is a semi-static downlink time unit and the time unit is a flexible time unit. In a case that the time unit corresponding to the first timer is not a semi-static downlink time unit or a flexible time unit, running of the first timer is suspended.

Optionally, in this embodiment of the present application, after the first timer is started or restarted, in a case that it is determined that the time unit corresponding to the first timer does not meet the first condition, running of the first timer is suspended. In this way, it is determined whether the condition for suspending running and continuing running of the timer related to discontinuous reception DRX is met. This can ensure that the terminal device has enough opportunities to be scheduled during the running of the timer, so that the data packet can have, within packet delay budget PDB, the transmission or sending opportunity that meets the requirement and the packet loss rate or the incorrect transmission rate is decreased, thus improving the system throughputs.

Optionally, in the discontinuous reception DRX configuration method of this embodiment of the present application, the DRX may include long-cycle DRX and/or short-cycle DRX.

Optionally, in the discontinuous reception DRX configuration method of this embodiment of the present application, before step 201, the following content may also be included: reporting, to a network-side device, a capability of whether the terminal device supports determining whether to suspend or continue running of the first timer. In this way, the network-side device can determine, according to the capability reported by the terminal device, whether to configure the first timer capable of determining whether to suspend or continue running.

Optionally, in the discontinuous reception DRX configuration method of this embodiment of the present application, the first condition includes, but not limited to at least one of the following.

(1) The time unit is a downlink time unit. Optionally, the downlink time unit includes, but is not limited to: a semi-static downlink time unit or a downlink time unit indicated by indication signaling in a subframe format.

(2) The time unit is an uplink time unit. Optionally, the uplink time unit includes, but is not limited to: a semi-static uplink time unit or an uplink time unit indicated by indication signaling in a subframe format.

(3) There is no synchronization signal and PBCH block (SSB) in the time unit.

(4) There is an SSB in the time unit.

(5) The time unit is a special time unit, a ratio of a number of downlink symbols in the special time unit to a total number of symbols in the special time unit is greater than a first ratio, and the first ratio is greater than 0 and less than 1. Optionally, the special time unit includes, but is not limited to a semi-static special time unit.

(6) There is no PDCCH monitoring occasion in the time unit. The PDCCH monitoring occasion may be one or more PDCCH monitoring occasions.

(7) There is a PDCCH monitoring occasion in the time unit.

(8) There is no PDCCH monitoring occasion of a first search space or a first search space group in the time unit. Optionally, the first search space is a specific type of search space or a search space scrambled by a specific radio network temporary identifier (RNTI). For example, the first search space may be a search space scrambled by a system information radio network temporary identifier (SI-RNTI), or a Type 0 or Type 0 A common search space. Optionally, the first search space group may be any one or more search space groups configured by the network-side device, for example, search space group 1 and/or search space group 2.

(9) There is a PDCCH monitoring occasion of a first search space or a first search space group in the time unit.

(10) First downlink control information (DCI) is not received within the time unit. For example, the first DCI is DCI 1-1 or DCI 0-1.

(11) First DCI is received within the time unit.

(12) A bandwidth part (BWP) activated in the time unit is a first BWP, and the first BWP is one of the following: a non-dormant BWP, a dormant BWP, a first activated BWP, and a default BWP.

(13) The time unit is not a target time unit, and the target time unit corresponds to at least one of the following: a BWP switching delay, an interruption time caused by BWP switching, or a first application delay. For example, in a case that time units 1 and 2 are within the BWP switching delay, the time units 1 and 2 are the target time unit.

Optionally, the first application delay may be a search space group application delay, a minimum K0/K2 application delay, and the like. K0 refers to a time interval between a PDCCH and a physical downlink shared channel (PDSCH) scheduled by the PDCCH; and K2 refers to a time interval between a PDCCH and a physical uplink shared channel (PUSCH) scheduled by the PDCCH.

(14) The time unit is the target time unit.

Optionally, in the discontinuous reception DRX configuration method of this embodiment of the present application, step 203 may be executed as follows: in a case that a first time unit in which a start time or a restart time of the first timer is located does not meet the first condition, suspending running of the first timer; and in a case that an i-th time unit after the first time unit does not meet the first condition, suspending running of the first timer until an (i+m)-th time unit meets the first condition, where i and m are integers greater than or equal to 1.

It can be understood that before the first timer expires, it is sequentially determined whether each time unit corresponding to the first timer meets the first condition, in a case that it is determined that the first condition is not met in a current time unit, running of the first timer starts to be suspended at a start time of the current time unit until it is determined that a time unit meets the first condition, or until the first timer expires. Optionally, in the discontinuous reception DRX configuration method of this embodiment of the present application, the following content may also be included: in a case that the time unit corresponding to the first timer meets the first condition, continuing to run the first timer.

It can be understood that after the first timer is started or restarted, in a case that it is determined that the time unit corresponding to the first timer meets the first condition, running of the first timer is continued or resumed.

The continuing running of the first timer may be understood as performing a decreasing operation, and the decreasing operation may refer to decreasing by a time unit.

In addition, the continuing running of the first timer refers to continuing to run the first timer in a time unit that meets the first condition. The start time of continuing or resuming running is the start time of the time unit that meets the first condition.

Optionally, in a case that the time unit corresponding to the first timer meets the first condition, the step of continuing to run the first timer may include: in a case that the time unit corresponding to the first timer is a flexible time unit, continuing to run the first timer in the flexible time unit.

In an embodiment, the first condition includes: the time unit is a downlink time unit and the time unit is a flexible time unit. In a case that the time unit corresponding to the first timer is a downlink time unit or a flexible time unit, running of the first timer is continued.

In another embodiment, the first condition includes: the time unit is a semi-static downlink time unit and the time unit is a flexible time unit. In a case that the time unit corresponding to the first timer is a semi-static downlink time unit or a flexible time unit, running of the first timer is continued. Optionally, in the DRX configuration method of this embodiment of the present application, the step of continuing to run the first timer in a case that the time unit corresponding to the first timer meets the first condition may be executed as follows: in a case that a first time unit in which a start time or a restart time of the first timer is located meets the first condition, continuing to run the first timer; and in a case that an i-th time unit after the first time unit meets the first condition, continuing to run the first timer until an (i+n)-th time unit does not meet the first condition, or until the first timer expires, where i and n are integers greater than or equal to 1.

It can be understood that before the first timer expires, it is sequentially determined whether each time unit corresponding to the first timer meets the first condition, and in a case that it is determined that a current time unit meets the first condition, the first timer continues to decrease the current time unit until it is determined that a time unit meets the first condition, or until the first timer expires.

Optionally, in the discontinuous reception DRX configuration method of this embodiment of the present application, the duration for which the first timer is suspended is one of the following: an active time, a DRX active time, and an inactive time. That is, when running of the first timer is suspended, the terminal device may be in an active state, a DRX active state, or an inactive state.

Optionally, in the discontinuous reception DRX configuration method of this embodiment of the present application, the first timer includes, but is not limited to at least one of the following: a DRX onduration timer (drx-ondurationtimer); a DRX inactivity timer (drx-inactivitytimer); or a timer related to DRX configuration and/or PDCCH monitoring.

Optionally, in the discontinuous reception DRX configuration method of this embodiment of the present application, all the above types of time units (such as the first time unit, the second time unit, the third time unit, and the time unit corresponding to the first timer) include, but are not limited to, any one of a slot, a subframe, a symbol, a set of slots, a set of subframes, and a set of symbols.

In one example, the first timer is drx-inactivitytimer, the medium access control (MAC) layer protocol stipulates a condition for determining suspending or continuing running of drx-inactivitytimer; the time unit is a subframe; and the first condition stipulated by the network-side device or the protocol is that the current subframe is a downlink subframe or a special subframe.

A long DRX cycle parameter configured by the network-side device is as follows: LongDRXcycle=10 ms; drx-ondurationtimer=3 ms; and drx-inactivitytimer=2 ms.

Figure 3:
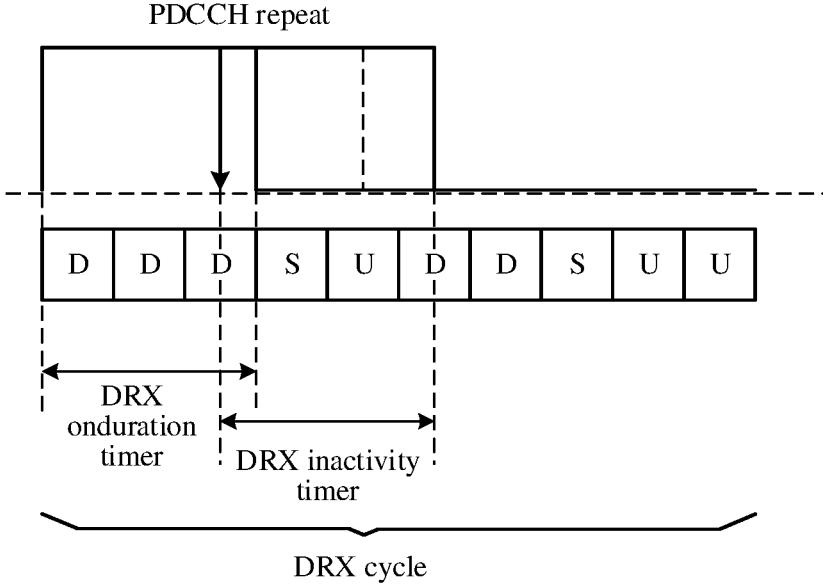
FIG. 3 is a schematic configuration diagram of a drx-inactivity timer according to an embodiment of the present application.

Protocol stipulation: During running of drx-inactivitytimer, the terminal device sequentially determines, according to the frame structure configured by the network-side device, for example, the frame structure is DDDSUDDSUU as shown in FIG. 3, whether each subframe corresponding to drx-inactivitytimer is a downlink subframe or a special subframe. In a case that the current subframe is a downlink subframe or a special subframe, running of drx-inactivity-timer is continued; otherwise, in a case that the current subframe is an uplink subframe, running of drx-inactivity-timer is suspended in the uplink subframe. It can be understood that because there is an uplink subframe before drx-inactivitytimer expires, timeout of drx-inactivitytimer that originally should time out within 2 ms is delayed.

As shown in FIG. 3, because the start position of the drx-Inactivity timer is a downlink subframe (decreases from a symbol in the subframe), the above determining condition is met. The second subframe is a special subframe, which also meets the above determining condition. However, the third subframe is an uplink subframe, which does not meet the above determining condition. Therefore, running of drx-Inactivitytimer starts to stop at the start position of the uplink subframe. It continues to be determined that the next subframe is a downlink subframe, which meets the above determining condition. Therefore, the drx-Inactivitytimer resumes running at the start time of the downlink subframe until drx-Inactivitytimer expires or returns to zero in a symbol in the subframe.

In addition, in a case that uplink and downlink of the network-side device are configured according to a granularity of a slot or a set of slots or a symbol or a set of symbols, a granularity of determining becomes the level of a slot or a set of slots or a symbol or a set of symbols.

In this example, in a TDD system, a characteristic of an XR service model is used and compensation of a downlink scheduling opportunity after power saving is comprehensively considered.

It should be noted that, in the discontinuous reception DRX configuration method of this embodiment of the present application, protocol stipulation may also be understood as pre-stipulation, pre-definition, pre-specification, and the like.

Optionally, in the discontinuous reception DRX configuration method of this embodiment of the present application, the following content may also be included: determining a target start time of the first timer according to the start time offset rule, where the start time offset rule is related to a first time range, and the first time range is related to an initial start time of the first timer.

It can be understood that the initial start time of the first timer refers to the start time of the first timer used before the target start time of the first timer is determined (adjusted) according to the start offset rule.

In this embodiment, the start position of the first timer, that is, the target start time, may be adjusted based on the start time offset rule, to avoid starting monitoring a PDCCH at a "invalid" position of the first timer, to ensure that the terminal device has sufficient opportunities to be scheduled or transmitted in the PDB and the packet loss rate is reduced, thereby improving user experience while achieving power saving. Herein, "invalid" refers to a time unit that does not meet the first condition.

Further optionally, the step of determining the target start time of the first timer according to the start time offset rule may be executed as follows: in a case that a second time unit in which the initial start time is located meets the first condition and/or the second condition, determining the initial start time as the target start time; and in a case that the second time unit in which the initial start time is located does not meet the first condition and/or the second condition, determining a start time of a third time unit as the target start time; where the third time unit is a time unit that meets the first condition and/or the second condition within the first time range and that is closest to the initial start time.

It can be understood that when determining whether to adjust the initial position of the first timer according to the start time offset rule, it can be determined whether the initial start time of the first timer meets at least one of the first condition or the second condition.

The second condition is optionally: in the first timer started at the start time, a ratio of a number of time units meeting the first condition to a total number of time units corresponding to the first timer is greater than or equal to a second ratio, and the second ratio is greater than 0 and less than 1.

It can be understood that the first timer started at the target start time refers to the first timer started at the initial start time or the start time of the third time unit.

It can be understood that when the target start time of the first timer is determined based on the start time offset rule, the first timer is started based on the target start time, that is, the initial start time or the adjusted start time (that is, the start time of the third time unit), so that the ratio of the number of time units meeting the first condition to the total number of time units corresponding to the first timer during the running of the first timer is greater than or equal to a specific ratio, that is, a second ratio.

In the above example of determining the target start time of the first timer according to the start time offset rule, the characteristic of the XR service model is used and compensation of a downlink scheduling opportunity after power saving is comprehensively considered.

Optionally, the first time range is a time range determined based on the first time interval and/or the first direction. The first direction includes, but is not limited to one of the following: forward, backward, first forward and then backward, and first backward and then forward. The first time interval includes N slots or subframes.

The first time interval and the first direction may be configured by the network-side device. Optionally, when the first direction is not configured by the network-side device, the first direction may be backward by default; and when the first time interval is not configured by the network-side device, the first time interval may be infinite or the first time interval is greater than or equal to the length of the first timer by default.

Optionally, in the discontinuous reception DRX configuration method of this embodiment of the present application, at least one of the following is stipulated by the protocol or configured by the network-side device:

the first time range; where the first time range includes N slots or subframes, and N is an integer greater than or equal to 0; or a default time range.

It should be noted that, when the first time range is not configured by the network-side device or not stipulated in the protocol, a preconfigured default time range may be determined as the first time range.

Optionally, in the discontinuous reception DRX configuration method of this embodiment of the present application, the following content may also be included:

receiving second DCI, where the second DCI carries indication information of the start time offset rule. That is, based on the indication information, the start time offset rule may be updated, for example, the first time range related to the start time offset rule is updated, so as to ensure the accuracy of the start position of the first timer.

In an example, the first DCI is DCI 2-0, and the configuration of the start time offset rule of the first timer may be dynamically updated according to the DCI 2-0.

For example, the network-side device configures or the protocol defaults that the start time offset rule of the first timer includes: the first time range is offset or adjusted based on the current start time of the first timer within two subframes after the current start time. A change indication of the start time offset rule of the first timer in DCI 2-0 is received, so that the first time interval is changed to 5 subframes.

Further optionally, in the discontinuous reception DRX configuration method of this embodiment of the present application, before the step of determining the target start time of the first timer according to the start time offset rule, the following content may also be included: reporting a reference value of the first time range to the network-side device, where the reference value of the first time range is used to determine the first time range.

In another example, the first timer is drx-ondurationtimer, and the protocol stipulates that the start time offset rule of drx-ondurationtimer is: the first time range is determined within next three subframes based on the initial start time that is not offset or adjusted. The time unit corresponding to the first timer is a subframe, and the network-side device configures or the protocol stipulates that the first condition is that the current subframe is a downlink subframe or a special subframe and there is a PDCCH monitoring occasion in the current subframe, where the first time range may or may not include a subframe where the start time of the ondurationtimer is located. The subframe where the start position of the drx-ondurationtimer is located is determined based on a parameter drx-startoffset.

A long DRX cycle parameter configured by the network-side device is as follows: LongDRXcycle=10 ms; drx-ondurationtimer=3 ms; and drx-inactivitytimer=2 ms.

Figure 4:
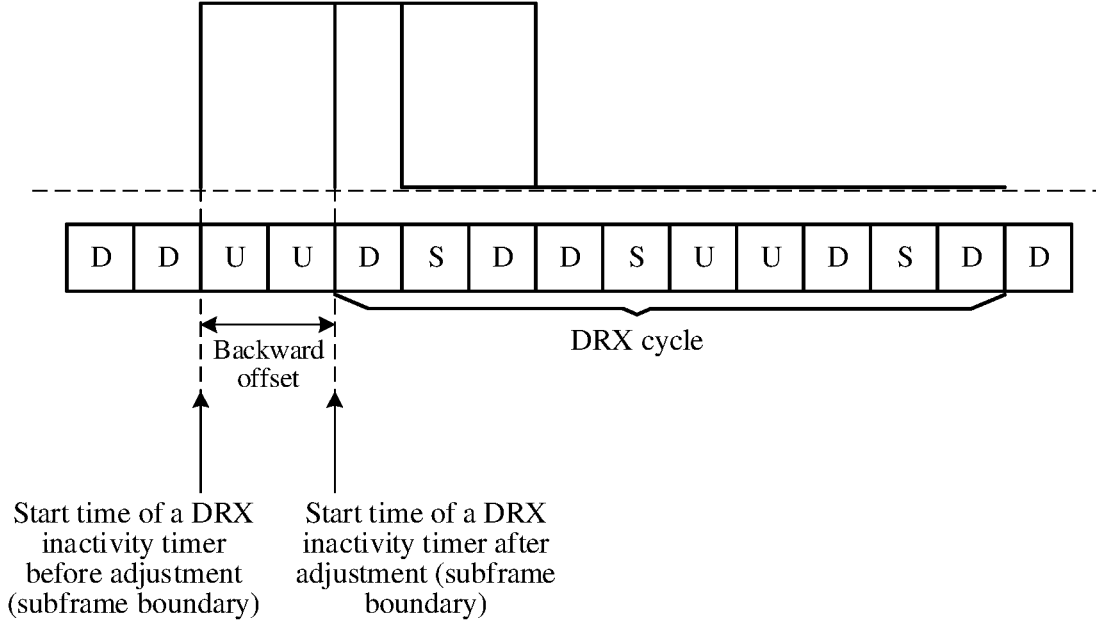
FIG. 4 is a schematic configuration diagram of another drx-inactivity timer according to an embodiment of the present application.

As shown in FIG. 4, the start position of the drx-ondurationtimer before adjustment is the boundary of an uplink subframe. In a case that the first condition is not met, it is sequentially determined, in the three subframes after the start position according to the offset rule, whether the first condition is met. At the last position, the UE finds that the first condition is met in a first subframe after the start position. Therefore, the start position of drx-ondurationtimer is adjusted to the start position of this subframe. For details, refer to the following formula.

(1) For long-cycle DRX, the formula [(SFN×10)+subframe number] modulo (drx-LongCycle)=drx-StartOffset should be modified accordingly:

$$[(SFN \times 10) + \text{subframe number} + \text{shiftsubframenumber}]$$
$$\text{modulo (drx-LongCycle)} = \text{drx-StartOffset}.$$

(2) For short-cycle DRX, the formula [(SFN×10)+subframe number] modulo (drx-ShortCycle)=(drx-StartOffset) modulo (drx-ShortCycle) should be modified accordingly:

$$[(SFN \times 10) + \text{subframe number} + \text{shiftsubframenumber}]$$
$$\text{modulo (drx-ShortCycle)} = (\text{drx-StartOffset})$$
$$\text{modulo (drx-ShortCycle)}.$$

The shiftsubframenumber is a start subframe offset 2 of the drx-ondurationtimer determined according to the above rule 1. In yet another example, the first timer is drx-ondurationtimer, the protocol stipulates that the start time offset rule of drx-inactivitytimer is backward offset, the time unit corresponding to the first timer is a subframe, and the network-side device configures or the protocol stipulates that the first condition is that the current subframe is a downlink subframe.

A long DRX cycle parameter configured by the network-side device is as follows: LongDRXcycle=10 ms; drx-ondurationtimer=3 ms; and drx-inactivitytimer=2 ms; and K=100% (that is, the second ratio).

Figure 5:
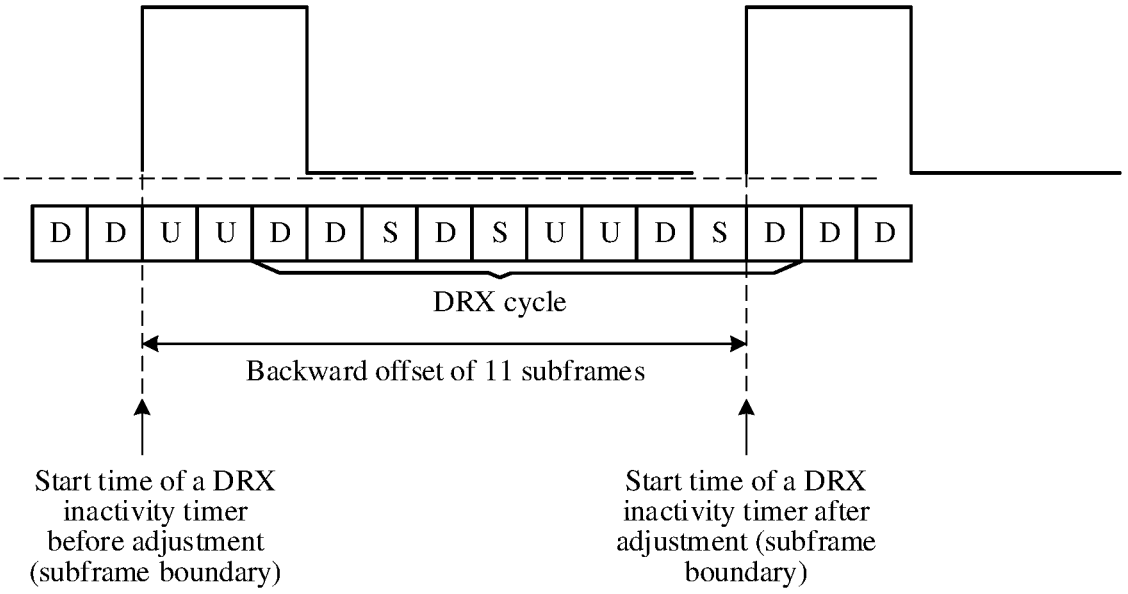
FIG. 5 is a schematic configuration diagram of still another drx-inactivity timer according to an embodiment of the present application.

As shown in FIG. 5, the start position of the drx-ondu-rationtimer before adjustment is the boundary of an uplink subframe. In a case that the first condition is not met, it is sequentially determined, in the three subframes after the start position according to the offset rule, whether the first condition is met. At the last position, the UE finds that the first condition is met in a first subframe after the start position. Therefore, the start position of drx-ondurationtimer is adjusted to the start position of this subframe. For details, refer to the following formula.

(1) For long-cycle DRX, the formula $[(SFN×10)+sub-frame\ number]\ modulo\ (drx\text{-}LongCycle)=drx\text{-}StartOffset$ should be modified accordingly:

$$[(SFN×10)+subframe\ number+shiftsubframenumber]\\ modulo\ (drx\text{-}LongCycle)=drx\text{-}StartOffset.$$

(2) For short-cycle DRX, the formula $[(SFN×10)+sub-frame\ number]\ modulo\ (drx\text{-}ShortCycle)=(drx\text{-}StartOffset)\ modulo\ (drx\text{-}ShortCycle)$ should be modified accordingly:

$$[(SFN×10)+subframe\ number+shiftsubframenumber]\\ modulo\ (drx\text{-}ShortCycle)=(drx\text{-}StartOffset)\\ modulo\ (drx\text{-}ShortCycle).$$

The shiftsubframenumber is a start subframe offset 2 of the drx-ondurationtimer determined according to the above rule. shiftsubframenumber=11, and the ratio of downlink subframes in the ondurationtimer reaches 100%.

An embodiment of the present application further provides a discontinuous reception DRX configuration method, executed by a terminal device. The method includes the following process steps.

A target start time of the first timer is determined according to a start time offset rule; where the start time offset rule is related to a first time range, and the first time range is related to an initial start time of the first timer.

It can be understood that the initial start time of the first timer refers to the start time of the first timer used before the target start time of the first timer is determined (adjusted) according to the start offset rule.

In this embodiment, the start position of the first timer, that is, the target start time, may be adjusted based on the start time offset rule, so as to avoid starting monitoring of a PDCCH at an "invalid" position of the first timer, to ensure that the terminal device has sufficient opportunities to be scheduled or transmitted in the PDB and the packet loss rate is reduced, thereby improving user experience while achieving power saving. Herein, "invalid" refers to a time unit that does not meet the first condition.

Optionally, the step of determining the target start time of the first timer according to the start time offset rule may be executed as follows:

In a case that the time unit in which the initial start time is located meets the first condition and/or the second condition, the initial start time is determined as the target start time. In a case that the time unit in which the initial start time is located does not meet the first condition and/or the second condition, the start time of the target time unit is determined as the target start time; where the target time unit is a time unit that meets the first condition and/or the second condition within the first time range and that is closest to the initial start time.

It can be understood that when determining, according to the start time offset rule, whether to adjust the initial position of the first timer, it can be determined whether the initial start time of the first timer meets at least one of the first condition or the second condition.

It should be noted that, for the first condition, the second condition, the first time range, the update of the start time offset rule, and the like, refer to the relevant content in the above embodiment shown in FIG. 2.

An embodiment of the present application provides a discontinuous reception DRX configuration method, performed by a terminal device. The method further includes: starting or restarting a first timer; and suspending running of the first timer in a case that a time unit corresponding to the first timer meets a second condition.

Optionally, the step of suspending running of the first timer in a case that a time unit corresponding to the first timer meets a second condition includes: in a case that a first time unit in which a start time or a restart time of the first timer is located meets the second condition, suspending running of the first timer; or in a case that an i-th time unit after the first time unit meets the second condition, suspending running of the first timer until an (i+m)-th time unit does not meet the second condition, where i and m are integers greater than or equal to 1.

In an embodiment, the second condition includes: the time unit is a semi-static uplink time unit. In a case that the time unit corresponding to the first timer is a semi-static uplink time unit, running of the first timer is suspended.

Optionally, the DRX configuration method of this embodiment of the present application further includes: in a case that the time unit corresponding to the first timer does not meet the second condition, continuing to run the first timer.

Optionally, the step of continuing to run the first timer in a case that the time unit corresponding to the first timer does not meet the second condition includes: in a case that a first time unit in which a start time or a restart time of the first timer is located does not meet the second condition, continuing to run the first timer; and/or in a case that an i-th time unit after the first time unit does not meet the second condition, continuing to run the first timer until an (i+n)-th time unit meets the second condition, or until the first timer expires, where i and n are integers greater than or equal to 1.

In an embodiment, the second condition includes: the time unit is a semi-static uplink time unit. In a case that the time unit corresponding to the first timer is not a semi-static uplink time unit, running of the first timer is continued. Optionally, the second condition includes at least one of the following: the time unit is a downlink time unit; the time unit is a semi-static downlink time unit; the time unit is an uplink time unit; the time unit is a semi-static uplink time unit; the time unit is a flexible time unit; there is no synchronization signal and PBCH block SSB in the time unit; there is an SSB in the time unit; the time unit is a special time unit, a ratio of a number of downlink symbols in the special time unit to a total number of symbols in the special time unit is greater than a first ratio, and the first ratio is greater than 0 and less than 1; there is no PDCCH monitoring occasion in the time unit; there is a PDCCH monitoring occasion in the time unit; there is no PDCCH monitoring occasion of a first search space or a first search space group in the time unit; there is a PDCCH monitoring occasion of a first search space or a first search space group in the time unit; first downlink control information DCI is not received within the time unit; first DCI is received within the time unit; a bandwidth part BWP activated in the time unit is a first BWP, and the first BWP is one of the following: a non-dormant BWP, a dormant BWP, a first activated BWP, and a default BWP; the time unit is not a target time unit, and the target time unit corresponds to at least one of the following: a BWP switching delay, an interruption time caused by BWP switching, or a first application delay; or the time unit is the target time unit.

Optionally, the first search space is a specific type of search space or a search space scrambled by a specific radio network temporary identifier (RNTI).

Optionally, the first timer includes at least one of the following: a DRX onduration timer; a DRX inactivity timer; or a timer related to DRX configuration and/or PDCCH monitoring.

Optionally, the time unit includes any one of a slot, a subframe, a symbol, a set of slots, a set of subframes, and a set of symbols.

Figure 6:
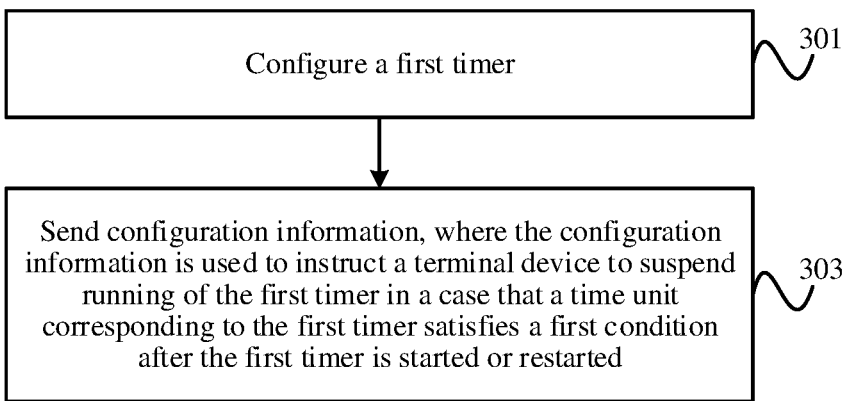
FIG. 6 is a schematic flowchart of another discontinuous reception DRX configuration method according to an embodiment of the present application.

Referring to FIG. 6, an embodiment of the present application provides a discontinuous reception DRX configuration method, executed by a network-side device. The method includes the following process steps.

Step 301: Configure a first timer.

Step 303: Send configuration information, where the configuration information is used to instruct the terminal device to suspend running of the first timer in a case that a time unit corresponding to the first timer meets a first condition after the first timer is started or restarted.

A condition for triggering starting or restarting the first timer includes, but is not limited to at least one of the following: periodically starting the first timer at a start time of a DRX cycle; or starting or restarting the first timer in a first symbol after receiving a PDCCH indicating a new transmission. A specific triggering condition is not limited herein.

In this embodiment of the present application, the first timer is configured for the terminal device, so that after starting or restarting the first timer, the terminal device performs determining for the time unit corresponding to the first timer, and after determining that the time unit corresponding to the first timer does not meet the first condition, suspends running of the first timer. In this way, it is determined whether the condition for suspending running and continuing running of the timer related to discontinuous reception DRX is met. This can ensure that the terminal device has enough opportunities to be scheduled during the running of the timer, so that the data packet can have, within packet delay budget PDB, the transmission or sending opportunity that meets the requirement and the packet loss rate or the incorrect transmission rate is decreased, thus improving the system throughputs.

The suspending running of the first timer may also be referred to as suspending the first timer. This can be understood as that the first timer performs neither a decreasing operation (that is, performs neither a time decreasing operation) nor an increasing operation. The decreasing operation may refer to decreasing by a time unit.

In addition, the suspending running of the first timer refers to suspending running of the first timer in a time unit that does not meet the first condition. A start time of suspending running of the first timer is a start time of the time unit that does not meet the first condition.

Optionally, in the discontinuous reception DRX configuration method of this embodiment of the present application, the DRX may include long-cycle DRX and/or short-cycle DRX.

Optionally, in the discontinuous reception DRX configuration method of this embodiment of the present application, before step 301, the following content may also be included: receiving, from the terminal device, a capability of whether the terminal device supports determining whether to suspend or continue running of the first timer. In this way, it can be determined, according to the capability reported by the terminal device, whether to configure the first timer capable of determining whether to suspend or continue running.

Optionally, in the discontinuous reception DRX configuration method of this embodiment of the present application, the first condition includes, but not limited to at least one of the following.

(1) The time unit is a downlink time unit. Optionally, the downlink time unit includes, but is not limited to: a semi-static downlink time unit or a downlink time unit indicated by indication signaling in a subframe format.

(2) The time unit is an uplink time unit. Optionally, the uplink time unit includes, but is not limited to: a semi-static uplink time unit or an uplink time unit indicated by indication signaling in a subframe format.

(3) There is no synchronization signal and PBCH block SSB in the time unit.

(4) There is an SSB in the time unit.

(5) The time unit is a special time unit, a ratio of a number of downlink symbols in the special time unit to a total number of symbols in the special time unit is greater than a first ratio, and the first ratio is greater than 0 and less than 1. Optionally, the special time unit includes, but is not limited to a semi-static special time unit.

(6) There is no PDCCH monitoring occasion in the time unit. The PDCCH monitoring occasion may be one or more PDCCH monitoring occasions.

(7) There is a PDCCH monitoring occasion in the time unit.

(8) There is no PDCCH monitoring occasion of a first search space or a first search space group in the time unit. Optionally, the first search space is a specific type of search space or a search space scrambled by a specific radio network temporary identifier (RNTI). For example, the first search space may be a search space scrambled by a SI-RNTI, or a Type 0 or Type 0 A common search space. Optionally, the first search space group may be any one or more search space groups configured by the network-side device, for example, search space group 1 and/or search space group 2.

(9) There is a PDCCH monitoring occasion of a first search space or a first search space group in the time unit.

(10) First downlink control information DCI is not received within the time unit. For example, the first DCI is DCI 1-1 or DCI 0-1.

(11) The first DCI is received within the time unit.

(12) A bandwidth part BWP activated in the time unit is a first BWP, and the first BWP is one of the following: a non-dormant BWP, a dormant BWP, a first activated BWP, and a default BWP.

(13) The time unit is not a target time unit, and the target time unit corresponds to at least one of the following: a BWP switching delay, an interruption time caused by BWP switching, or a first application delay. For example, in a case that time units 1 and 2 are within the BWP switching delay, the time units 1 and 2 are the target time unit.

Optionally, the first application delay may be a search space group application delay, a minimum K0/K2 application delay, and the like. K0 refers to a time interval between a PDCCH and a PDSCH scheduled by the PDCCH; and K2 refers to a time interval between a PDCCH and a PUSCH scheduled by the PDCCH.

(14) The time unit is the target time unit.

Optionally, in the discontinuous reception DRX configuration method of this embodiment of the present application, step 301 may be executed as follows: configuring such that in a case that a first time unit in which a start time or a restart time of the first timer is located does not meet the first condition, running of the first timer is suspended; and configuring such that in a case that an i-th time unit after the first time unit does not meet the first condition, running of the first timer is suspended until an (i+m)-th time unit meets the first condition, where i and m are integers greater than or equal to 1.

It can be understood that it is configured that before the first timer expires, it is sequentially determined whether each time unit corresponding to the first timer meets the first condition, in a case that it is determined that the first condition is not met in a current time unit, running of the first timer starts to be suspended at a start time of the current time unit until it is determined that a time unit meets the first condition, or until the first timer expires.

Optionally, the discontinuous reception DRX configuration method of this embodiment of the present application may further include the following content: configuring such that in a case that the time unit corresponding to the first timer meets the first condition, running of the first timer is continued.

It can be understood that after the first timer is started or restarted, in a case that it is determined that the time unit corresponding to the first timer meets the corresponding first condition, running of the first timer is continued or resumed.

The continuing running of the first timer may be understood as performing a decreasing operation, and the decreasing operation may refer to decreasing by a time unit.

In addition, the continuing running of the first timer refers to continuing to run the first timer in a time unit that meets the first condition. The start time of continuing or resuming running is the start time of the time unit that meets the first condition.

Optionally, in the discontinuous reception DRX configuration method of this embodiment of the present application, the step of configuring such that in a case that the time unit corresponding to the first timer meets the first condition, running of the first timer is continued may be executed as follows: configuring such that in a case that a first time unit in which a start time or a restart time of the first timer is located meets the first condition, running of the first timer is continued; and configuring such that in a case that an i-th time unit after the first time unit meets the first condition, running of the first timer is continued until an (i+n)-th time unit does not meet the first condition, or until the first timer expires, where i and n are integers greater than or equal to 1.

It can be understood that it is configured that before the first timer expires, it is sequentially determined whether each time unit corresponding to the first timer meets the first condition, and in a case that it is determined that a current time unit meets the first condition, the first timer continues to decrease the current time unit until it is determined that a time unit meets the first condition, or until the first timer expires.

Optionally, in the discontinuous reception DRX configuration method of this embodiment of the present application, the duration for which the first timer is suspended is one of the following: an active time, a DRX active time, and an inactive time. That is, when running of the first timer is suspended, the terminal device may be in an active state, a DRX active state, or an inactive state.

Optionally, in the discontinuous reception DRX configuration method of this embodiment of the present application, the first timer includes, but is not limited to at least one of the following: a DRX onduration timer; a DRX inactivity timer; or a timer related to DRX configuration and/or PDCCH monitoring.

Optionally, in the discontinuous reception DRX configuration method of this embodiment of the present application, all the above types of time units (such as the first time unit, the second time unit, the third time unit, and the time unit corresponding to the first timer) include, but are not limited to, any one of a slot, a subframe, a symbol, a set of slots, a set of subframes, and a set of symbols.

Optionally, in the discontinuous reception DRX configuration method of this embodiment of the present application, the following content may also be included: configuring a start time offset rule, where the start time offset rule is used to determine a target start time of the first timer, the start time offset rule is related to a first time range, and the first time range is related to an initial start time of the first timer.

It can be understood that the initial start time of the first timer refers to the start time of the first timer used before the target start time of the first timer is determined (adjusted) according to the start offset rule.

In this embodiment, it may be configured that the start position of the first timer, that is, the target start time, may be adjusted based on the start time offset rule, to avoid starting monitoring a PDCCH at a "invalid" position of the first timer, to ensure that the terminal device has sufficient opportunities to be scheduled or transmitted in the PDB and the packet loss rate is reduced, thereby improving user experience while achieving power saving. Herein, "invalid" refers to a time unit that does not meet the first condition.

Further optionally, in the discontinuous reception DRX configuration method of this embodiment of the present application, when the second time unit in which the initial start time is located meets the first condition and/or the second condition, the target start time is the initial start time; when the second time unit in which the initial start time is located does not meet the first condition and/or the second condition, the target start time is a start time of a third time unit; where the third time unit is a time unit that meets the first condition and/or the second condition within the first time range and that is closest to the initial start time.

It can be understood that when configuring that whether to adjust the initial position of the first timer is determined according to the start time offset rule, it can be configured that whether the initial start time of the first timer meets at least one of the first condition or the second condition is determined.

The second condition is optionally: in the first timer started at the target start time, a ratio of a number of time units meeting the first condition to a total number of time units corresponding to the first timer is greater than or equal to a second ratio, and the second ratio is greater than 0 and less than 1.

It can be understood that the first timer started at the target start time refers to the first timer started at the initial start time or the start time of the third time unit.

It can be understood that when configuring that the target start time of the first timer is determined based on the start time offset rule, in a case that configuring that the first timer is started based on the target start time, that is, the initial start time or the adjusted start time (that is, the start time of the third time unit), the ratio of the number of time units meeting the first condition to the total number of time units corresponding to the first timer during the running of the first timer may be greater than or equal to a specific ratio, that is, a second ratio.

In the above example of determining the target start time of the first timer according to the start time offset rule, the characteristic of the XR service model is used and compensation of a downlink scheduling opportunity after power saving is comprehensively considered.

Optionally, the first time range is a time range determined based on the first time interval and/or the first direction configured by the network-side device. The first direction includes, but is not limited to one of the following: forward, backward, first forward and then backward, and first backward and then forward. The first time interval includes N slots or subframes.

When the first direction is not configured by the network-side device, the first direction may be backward by default; and when the first time interval is not configured by the network-side device, the first time interval may be infinite or the first time interval is greater than or equal to the length of the first timer by default.

Optionally, the discontinuous reception DRX configuration method of this embodiment of the present application may further include at least one of the following:

(1) configuring the first time range; where the first time range includes N slots or subframes, and N is an integer greater than or equal to 0; or (2) configuring the default time range. In this way, when the first time range is not configured by the network-side device or stipulated in the protocol, the terminal device may determine, as the first time range, a default time range preconfigured by the network-side device.

Optionally, in the discontinuous reception DRX configuration method of this embodiment of the present application, the following content may be further included: sending second DCI to the terminal device, where the second DCI carries indication information of the start time offset rule. That is, based on the indication information, the terminal device may be instructed to update the start time offset rule, for example, update the first time range related to the start time offset rule, so as to ensure the accuracy of the start position of the first timer.

Optionally, in the discontinuous reception DRX configuration method of this embodiment of the present application, before step 301, the following content may also be included:

1. receiving a reference value of the first time range reported by the terminal device, where the reference value of the first time range is used to determine the first time range.

The embodiments of the present application also provide a discontinuous reception DRX configuration method, executed by a network-side device. The method includes the following process steps: configuring a start time offset rule, where the start time offset rule is used to determine a target start time of the first timer, the start time offset rule is related to a first time range, and the first time range is related to an initial start time of the first timer.

In this embodiment, it can be configured that the start position of the first timer, that is, the target start time, is adjusted based on the start time offset rule, to ensure that the terminal device has sufficient opportunities to be scheduled or transmitted in the PDB and the packet loss rate is reduced, thereby improving user experience while achieving power saving.

Further optionally, in the discontinuous reception DRX configuration method of this embodiment of the present application, when the time unit in which the initial start time is located meets the first condition and/or the second condition, the target start time is the initial start time; when the time unit in which the initial start time is located does not meet the first condition and/or the second condition, the target start time is a start time of the target time unit; where the target time unit is a time unit that meets the first condition and/or the second condition within the first time range and that is closest to the initial start time.

It can be understood that when configuring that whether to adjust the initial position of the first timer is determined according to the start time offset rule related to the initial start time of the first timer, it can be configured that whether the initial start time of the first timer meets at least one of the first condition or the second condition is determined.

It should be noted that, for the first condition, the second condition, the first time range, the update of the start time offset rule, and the like, refer to the relevant content in the above embodiment shown in FIG. 6.

It should be noted that, the discontinuous reception DRX configuration method performed by the terminal device provided in this embodiment of the present application may be performed by a discontinuous reception DRX configuration apparatus, or a control module in the discontinuous reception DRX configuration apparatus configured to perform the discontinuous reception DRX configuration method. In the embodiments of the present application, an example in which the discontinuous reception DRX configuration apparatus performs the discontinuous reception DRX configuration method is used to describe the discontinuous reception DRX configuration apparatus provided in the embodiments of the present application.

Figure 7:
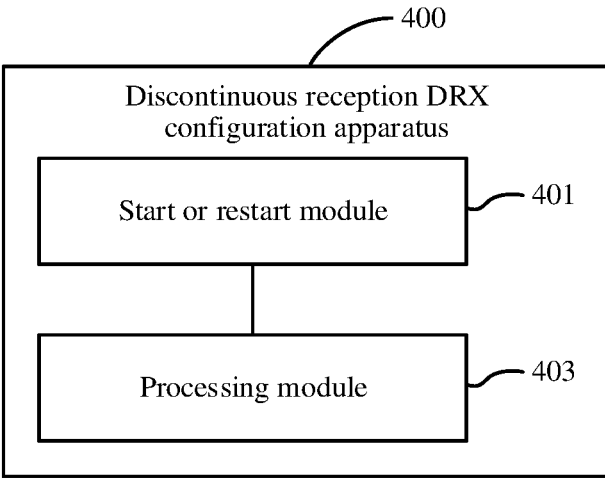
FIG. 7 is a schematic structural diagram of a discontinuous reception DRX configuration apparatus according to an embodiment of the present application.

Referring to FIG. 7, an embodiment of the present application provides a discontinuous reception DRX configuration apparatus 400, and the discontinuous reception DRX configuration apparatus 400 includes: a start or restart module 401 and a processing module 403.

The start or restart module 401 is configured to start or restart a first timer; and the processing module 403 is configured to suspend running of the first timer in a case that a time unit corresponding to the first timer does not meet a first condition.

Optionally, in the discontinuous reception DRX configuration apparatus 400 of this embodiment of the present application, the processing module 403 may be further configured to: in a case that a first time unit in which a start time or a restart time of the first timer is located does not meet the first condition, suspend running of the first timer; and in a case that an i-th time unit after the first time unit does not meet the first condition, suspend running of the first timer until an (i+m)-th time unit meets the first condition, where i and m are integers greater than or equal to 1.

Optionally, in the discontinuous reception DRX configuration apparatus 400 of this embodiment of the present application, the processing module 403 may also be configured to: when the time unit corresponding to the first timer meets the first condition, continue running of the first timer.

Optionally, in the discontinuous reception DRX configuration apparatus 400 of this embodiment of the present application, the processing module 403 may be further configured to: in a case that a first time unit in which a start time or a restart time of the first timer is located meets the first condition, continue running of the first timer; and in a case that an i-th time unit after the first time unit meets the first condition, continue running of the first timer until an (i+n)-th time unit does not meet the first condition, or until the first timer expires, where i and n are integers greater than or equal to 1.

Optionally, in the discontinuous reception DRX configuration apparatus 400 of this embodiment of the present application, the duration for which the first timer is suspended is one of the following: an active time, a DRX active time, and an inactive time.

Optionally, in the discontinuous reception DRX configuration apparatus 400 of this embodiment of the present application, the first condition includes at least one of the following: the time unit is a downlink time unit; the time unit is an uplink time unit; there is no synchronization signal and PBCH block SSB in the time unit; there is an SSB in the time unit; the time unit is a special time unit, a ratio of a number of downlink symbols in the special time unit to a total number of symbols in the special time unit is greater than a first ratio, and the first ratio is greater than 0 and less than 1; there is no PDCCH monitoring occasion in the time unit; there is a PDCCH monitoring occasion in the time unit; there is no PDCCH monitoring occasion of a first search space or a first search space group in the time unit; there is a PDCCH monitoring occasion of a first search space or a first search space group in the time unit; first downlink control information DCI is not received within the time unit; first DCI is received within the time unit; a bandwidth part BWP activated in the time unit is a first BWP, and the first BWP is one of the following: a non-dormant BWP, a dormant BWP, a first activated BWP, and a default BWP; the time unit is not a target time unit, and the target time unit corresponds to at least one of the following: a BWP switching delay, an interruption time caused by BWP switching, or a first application delay; or the time unit is the target time unit.

Optionally, in the discontinuous reception DRX configuration apparatus 400 of this embodiment of the present application, the first search space is a specific type of search space or a search space scrambled by a specific radio network temporary identifier (RNTI).

Optionally, the discontinuous reception DRX configuration apparatus 400 of this embodiment of the present application may also include:

ii. a determining module, configured to: according to a start time offset rule, determine a target start time of the first timer; where the start time offset rule is related to a first time range, and the first time range is related to an initial start time of the first timer.

Optionally, in the discontinuous reception DRX configuration apparatus 400 of this embodiment of the present application, the determining module may be further configured to: in a case that the second time unit in which the initial start time is located meets the first condition and/or the second condition, determine the initial start time as the target start time; in a case that the second time unit in which the initial start time is located does not meet the first condition and/or the second condition, determine a start time of the third time unit as the target start time; where the target time unit is a time unit that meets the first condition and/or the second condition within the first time range and that is closest to the initial start time.

Optionally, in the discontinuous reception DRX configuration apparatus 400 of this embodiment of the present application, the second condition is: in the first timer started at the target start time, a ratio of a number of time units meeting the first condition to a total number of time units corresponding to the first timer is greater than or equal to a second ratio, and the second ratio is greater than 0 and less than 1.

Optionally, in the discontinuous reception DRX configuration apparatus 400 of this embodiment of the present application, at least one of the following items is stipulated by the protocol or configured by the network-side device:

the first time range; where the first time range includes N slots or subframes, and N is an integer greater than or equal to 0; or a default time range.

Optionally, the discontinuous reception DRX configuration apparatus 400 of this embodiment of the present application may further include: a receiving module, configured to receive second DCI, where the second DCI carries indication information of the start time offset rule.

Optionally, the discontinuous reception DRX configuration apparatus 400 of this embodiment of the present application may further include: a sending module, configured to: before the target start time of the first timer is determined according to the start time offset rule, report a reference value of the first time range to the network-side device, where the reference value of the first time range is used to determine the first time range.

Optionally, in the discontinuous reception DRX configuration apparatus 400 of this embodiment of the present application, the first timer includes at least one of the following: a DRX onduration timer; a DRX inactivity timer; or a timer related to DRX configuration and/or PDCCH monitoring.

Optionally, in the discontinuous reception DRX configuration apparatus 400 of this embodiment of the present application, the time unit includes any one of a slot, a subframe, a symbol, a set of slots, a set of subframes, and a set of symbols.

In the embodiments of the present application, after the first timer is started or restarted, in a case that it is determined that the time unit corresponding to the first timer does not meet the first condition, running of the first timer is suspended. In this way, it is determined whether the condition for suspending running and continuing running of the timer related to discontinuous reception DRX is met. This can ensure that the terminal device has enough opportunities to be scheduled during the running of the timer, so that the data packet can have, within packet delay budget PDB, the transmission or sending opportunity that meets the requirement and the packet loss rate or the incorrect transmission rate is decreased, thus improving the system throughputs.

The discontinuous reception DRX configuration apparatus of this embodiment of the present application may be an apparatus, or may be a component, an integrated circuit, or a chip in a terminal device. The apparatus may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (TV), a cash machine, a self-service machine, or the like, which is not specifically limited in this embodiment of the present application.

The discontinuous reception DRX configuration apparatus of this embodiment of the present application may be an apparatus with an operating system. The operating system may be an Android operating system, may be an iOS operating system, and may further be another possible operating system, which is not specifically limited in this embodiment of the present application.

The discontinuous reception DRX configuration apparatus provided in this embodiment of the present application may perform processes of the method embodiment in FIG. 2, and implement the same technical effect. To avoid repetition, details are not described herein again.

It should be noted that, the discontinuous reception DRX configuration method performed by the network-side device provided in the embodiments of the present application may be performed by a discontinuous reception DRX configuration apparatus, or a control module in the discontinuous reception DRX configuration apparatus configured to perform the discontinuous reception DRX configuration method. In the embodiments of the present application, an example in which the discontinuous reception DRX configuration apparatus performs the discontinuous reception DRX configuration method is used to describe the discontinuous reception DRX configuration apparatus provided in the embodiments of the present application.

Figure 8:
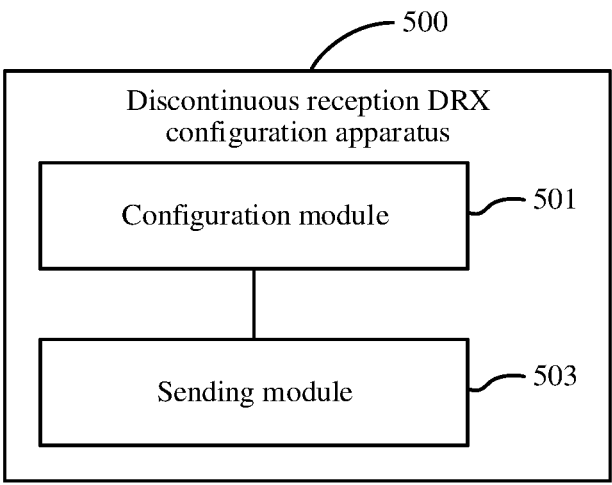
FIG. 8 is a schematic structural diagram of another discontinuous reception DRX configuration apparatus according to an embodiment of the present application.

Referring to FIG. 8, the embodiments of the present application provide a discontinuous reception DRX configuration apparatus 500, and the discontinuous reception DRX configuration apparatus 500 includes: a configuration module 501 and a sending module 503.

The configuration module 501 is configured to configure a first timer. The sending module 503 is configured to send configuration information, where the configuration information is used to instruct the terminal device to suspend running of the first timer in a case that a time unit corresponding to the first timer meets a first condition after the first timer is started or restarted.

Optionally, in the discontinuous reception DRX configuration apparatus 500 of this embodiment of the present application, the configuration module 501 may be further configured to:

iii. configure such that in a case that a first time unit in which a start time or a restart time of the first timer is located does not meet the first condition, running of the first timer is suspended; and configure such that in a case that an i-th time unit after the first time unit does not meet the first condition, running of the first timer is suspended until an (i+m)-th time unit meets the first condition, where i and m are integers greater than or equal to 1.

Optionally, in the discontinuous reception DRX configuration apparatus 500 of this embodiment of the present application, the configuration module 501 may also be configured to:

iv. configure such that in a case that the time unit corresponding to the first timer meets the first condition, running of the first timer is continued.

Optionally, in the discontinuous reception DRX configuration apparatus 500 of this embodiment of the present application, the configuration module 501 may be further configured to:

v. configure such that in a case that a first time unit in which a start time or a restart time of the first timer is located meets the first condition, running of the first timer is continued; and configure such that in a case that an i-th time unit after the first time unit meets the first condition, running of the first timer is continued until an (i+n)-th time unit does not meet the first condition, or until the first timer expires, where i and n are integers greater than or equal to 1.

Optionally, in the discontinuous reception DRX configuration apparatus 500 of this embodiment of the present application, the duration for which the first timer is suspended is one of the following: an active time, a DRX active time, and an inactive time.

Optionally, in the discontinuous reception DRX configuration apparatus 500 of this embodiment of the present application, the first condition includes at least one of the following.

The time unit is a downlink time unit; the time unit is an uplink time unit; there is no synchronization signal and PBCH block SSB in the time unit; there is an SSB in the time unit; the time unit is a special time unit, a ratio of a number of downlink symbols in the special time unit to a total number of symbols in the special time unit is greater than a first ratio, and the first ratio is greater than 0 and less than 1; there is no PDCCH monitoring occasion in the time unit; there is a PDCCH monitoring occasion in the time unit; there is no PDCCH monitoring occasion of a first search space or a first search space group in the time unit; there is a PDCCH monitoring occasion of a first search space or a first search space group in the time unit; first downlink control information DCI is not received within the time unit; first DCI is received within the time unit; a bandwidth part BWP activated in the time unit is a first BWP, and the first BWP is one of the following: a non-dormant BWP, a dormant BWP, a first activated BWP, and a default BWP; the time unit is not a target time unit, and the target time unit corresponds to at least one of the following: a BWP switching delay, an interruption time caused by BWP switching, or a first application delay; and the time unit is the target time unit.

Optionally, in the discontinuous reception DRX configuration apparatus 500 of this embodiment of the present application, the first search space is a specific type of search space or a search space scrambled by a specific radio network temporary identifier (RNTI).

Optionally, in the discontinuous reception DRX configuration apparatus 500 of this embodiment of the present application, the configuration module 501 may also be configured to: configure a start time offset rule, where the start time offset rule is used to determine a target start time of the first timer, the start time offset rule is related to a first time range, and the first time range is related to an initial start time of the first timer.

Optionally, in the discontinuous reception DRX configuration apparatus 500 of this embodiment of the present application, when the second time unit in which the initial start time is located meets the first condition and/or the second condition, the target start time is the initial start time; when the second time unit in which the initial start time is located does not meet the first condition and/or the second condition, the target start time is a start time of a third time unit; where the third time unit is a time unit that meets the first condition and/or the second condition within the first time range and that is closest to the initial start time.

Optionally, in the discontinuous reception DRX configuration apparatus 500 of this embodiment of the present application, the second condition is: in the first timer started at the target start time, a ratio of a number of time units meeting the first condition to a total number of time units corresponding to the first timer is greater than or equal to a second ratio, and the second ratio is greater than 0 and less than 1.

Optionally, in the discontinuous reception DRX configuration apparatus 500 of this embodiment of the present application, the configuration module 501 may also be configured to perform at least one of the following: configuring the first time range; where the first time range includes N slots or subframes, and N is an integer greater than or equal to 0; or configuring a default time range.

Optionally, in the discontinuous reception DRX configuration apparatus 500 of this embodiment of the present application, the sending module 503 may also be configured to: send second DCI to the terminal device, where the second DCI carries indication information of the start time offset rule.

Optionally, the discontinuous reception DRX configuration apparatus 500 in the embodiments of the present application may also include:

vi. a receiving module, configured to: before the start time offset rule is configured, receive a reference value of the first time range reported by the terminal device, where the reference value of the first time range is used to determine the first time range.

Optionally, in the discontinuous reception DRX configuration apparatus 500 of this embodiment of the present application, the first timer includes at least one of the following: a DRX onduration timer; a DRX inactivity timer; or a timer related to DRX configuration and/or PDCCH monitoring.

Optionally, in the discontinuous reception DRX configuration apparatus 500 of this embodiment of the present application, the time unit includes any one of a slot, a subframe, a symbol, a set of slots, a set of subframes, and a set of symbols.

In this embodiment of the present application, the first timer is configured for the terminal device, so that after starting or restarting the first timer, the terminal device performs determining for the time unit corresponding to the first timer, and after determining that the time unit corresponding to the first timer does not meet the first condition, suspends running of the first timer. In this way, it is determined whether the condition for suspending running and continuing running of the timer related to discontinuous reception DRX is met. This can ensure that the terminal device has enough opportunities to be scheduled during the running of the timer, so that the data packet can have, within packet delay budget PDB, the transmission or sending opportunity that meets the requirement and the packet loss rate or the incorrect transmission rate is decreased, thus improving the system throughputs.

The discontinuous reception DRX configuration apparatus in the embodiments of the present application may be an apparatus, or may be a component, an integrated circuit, or a chip in a network-side device. The apparatus may be a network-side device. Exemplarily, the network-side device may include, but not limited to, the types of the network-side device 12 listed above.

The discontinuous reception DRX configuration apparatus in the embodiments of the present application may be an apparatus with an operating system. The operating system may be an Android operating system, may be an ios operating system, and may further be another possible operating system, which is not specifically limited in this embodiment of the present application.

The discontinuous reception DRX configuration apparatus provided in the embodiments of the present application may perform various processes of the method embodiment in FIG. 6, and implement the same technical effect. To avoid repetition, details are not described herein again.

Figure 9:
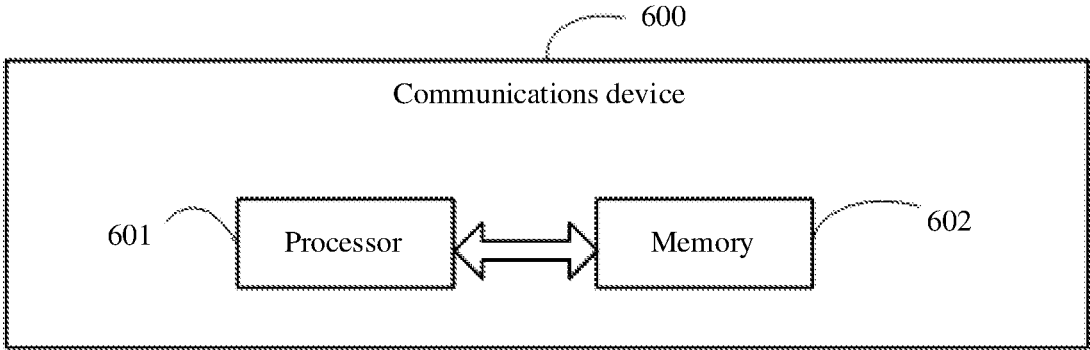
FIG. 9 is a schematic structural diagram of a communications device in an embodiment of the present application.

Optionally, as shown in FIG. 9, this embodiment of the present application further provides a communication device 600, including a processor 601, a memory 602, and a program or an instruction stored in the memory 602 and executable on the processor 601. For example, when the communication device 600 is a terminal, the program or instruction is executed by the processor 601 to implement various processes of the discontinuous reception DRX configuration method embodiment corresponding to FIG. 2, and may implement the same technical effect. When the communications device 600 is a network-side device, the programs or instructions are executed by the processor 601 to perform the processes of the embodiment of the discontinuous reception DRX configuration method corresponding to FIG. 6, and may implement the same technical effect, which are not repeated herein to avoid repetition.

Figure 10:
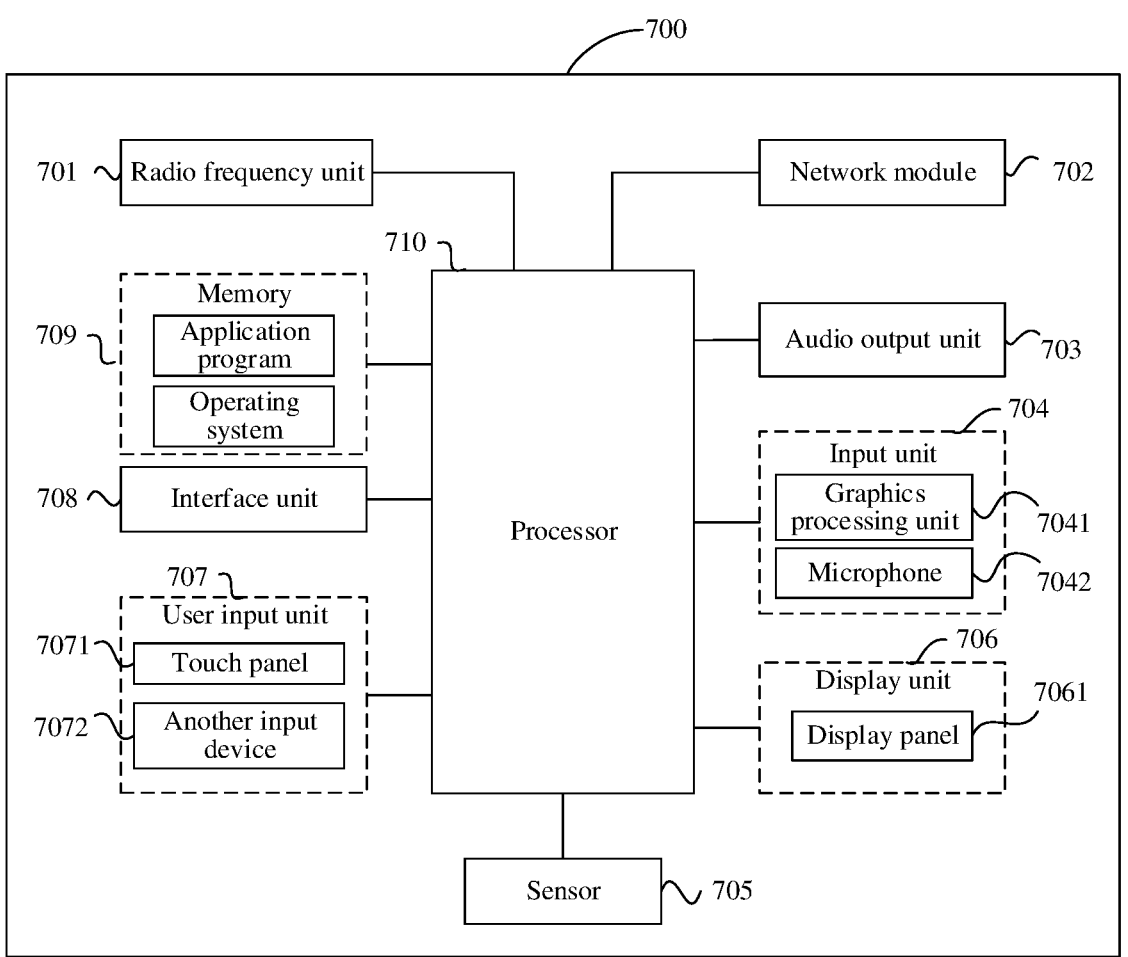
FIG. 10 is a schematic structural diagram of a terminal device according to an embodiment of the present application.

FIG. 10 is a schematic diagram of a hardware structure of a terminal according to an embodiment of the present application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to the processor 710 by a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used, and details are not repeated herein.

It should be understood that, in this embodiment of the present application, the input unit 704 may include a graphics processing unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In this embodiment of the present application, the radio frequency unit 701 receives downlink data from a network-side device and transmits the downlink data to the processor 710 for processing; and sends uplink data to the network-side device. Generally, the radio frequency unit 701 includes, but is not limited to, an antenna, at least one amplifier, a transceiver, a coupler, a low noise amplifier, a duplexer, and the like.

The memory 709 may be configured to store a software program or an instruction and various data. The memory 709 may mainly include a program or an instruction storage area and a data storage area. The program or instruction storage area may store an operating system, an application program or instruction required by at least one function (such as a sound playback function and an image display function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash memory device, or other non-volatile solid-state storage devices.

The processor 710 may include one or more processing units; and optionally, the processor 710 may integrate an application processor and a modem processor. The application processor mainly processes an operating system, a user interface, an application program or instruction, and the like.

The modem processor mainly processes wireless communication, such as a baseband processor. It may be understood that the foregoing modem may either not be integrated into the processor 710.

The processor 710 is configured to start or restart a first timer; and in a case that a time unit corresponding to the first timer does not meet a first condition, suspend running of the first timer.

In the embodiments of the present application, after the first timer is started or restarted, in a case that it is determined that the time unit corresponding to the first timer does not meet the first condition, running of the first timer is suspended. In this way, it is determined whether the condition for suspending running and continuing running of the timer related to discontinuous reception DRX is met. This can ensure that the terminal device has enough opportunities to be scheduled during the running of the timer, so that the data packet can have, within packet delay budget PDB, the transmission or sending opportunity that meets the requirement and the packet loss rate or the incorrect transmission rate is decreased, thus improving the system throughputs.

Figure 11:
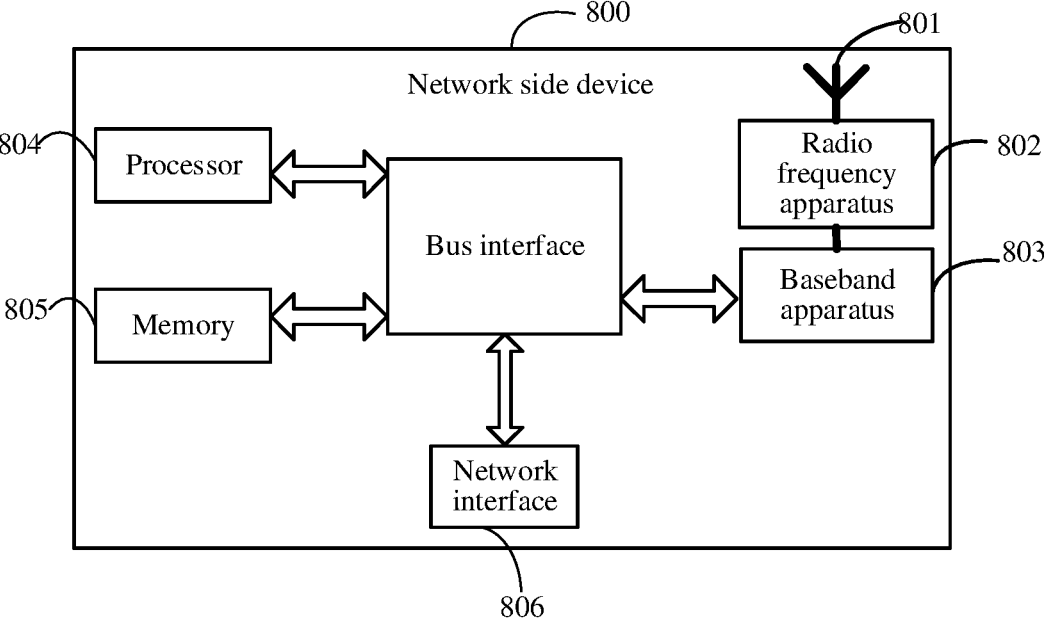
FIG. 11 is a schematic structural diagram of a network-side device according to an embodiment of the present application.

This embodiment of the present application further provides a network-side device. As shown in FIG. 11, the network device 800 includes: an antenna 801, a radio frequency apparatus 802, and a baseband apparatus 803. The antenna 801 is connected with the radio frequency apparatus 802. In an uplink direction, the radio frequency apparatus 802 receives information through the antenna 801, and transmits the received information to the baseband apparatus 803 for processing. In a downlink direction, the baseband apparatus 803 performs processing on the to-be-transmitted information, and transmits the to-be-transmitted information to the radio frequency apparatus 802. After performing processing on the received information, the radio frequency apparatus 802 transmits the received information out through the antenna 801.

The frequency band processing apparatus may be located in the baseband apparatus 803, and the method performed by the network-side device in the foregoing embodiments may be implemented in the baseband apparatus 803. The baseband apparatus 803 includes a processor 804 and a memory 805.

The baseband apparatus 803 may include, for example, at least one baseband board, and a plurality of chips are arranged on the baseband board. As shown in FIG. 11, for example, one of the chips is a processor 804, and is connected with the memory 805, to invoke the program in the memory 805, and to perform the network device operation shown in the foregoing method embodiments.

The baseband apparatus 803 may further include a network interface 806 used for exchanging information with the radio frequency apparatus 802. For example, the interface is a common public radio interface (CPRI).

The network-side device of this embodiment further includes: an instruction or a program stored on the memory 805 and executable on the processor 804. The processor 804 invokes the instruction or the program in the memory 805 to perform the method of executing each module shown in FIG. 8, and implements the same technical effect, which will not be described in detail herein again to avoid repetition.

This embodiment of the present application further provides a non-transitory readable storage medium storing therein a program or an instruction. The program or instruction, when executed by a processor, implements various processes of the discontinuous reception DRX configuration method embodiment, and may implement the same technical effects, which will not be described in detail herein again to avoid repetition.

The processor is a processor in the terminal or network-side device described in the foregoing embodiment. The non-transitory readable storage medium includes a non-transitory computer-readable storage medium, for example, a Read-Only Memory (ROM), a Random Access Memory (RAM), a magnetic disk, an optical disc or the like.

This embodiment of the present application further provides a computer program product, where the computer program product includes a processor, a memory, and a program or instruction stored in the memory and executable on the processor, and the program or instruction, when executed by the processor, implements various processes of the discontinuous reception DRX configuration method embodiment, and may implement the same technical effects, which will not be described in detail herein again to avoid repetition.

This embodiment of the present application further provides a chip. The chip includes a processor and a communication interface. The communication interface is coupled to the processor. The processor is configured to run a program or instruction on a terminal device or a network-side device to implement various processes of the discontinuous reception DRX configuration method embodiment, and may implement the same technical effects, which will not be described in detail herein again to avoid repetition.

It should be understood that, the chip mentioned in this embodiment of the present application may further be referred to as a system-level chip, a system chip, a chip system, a system on chip, or the like.

It is to be noted that the terms "include", "comprise", or any other variation thereof in this specification intends to cover a non-exclusive inclusion, which specifies the presence of stated processes, methods, objects, or apparatuses, but do not preclude the presence or addition of one or more other processes, methods, objects, or apparatuses. In addition, it should be noted that the scope of the methods and apparatuses in the implementations of the present application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present application.

Although the embodiments of the present application have been described above with reference to the accompanying drawings, the present application is not limited to the specific implementations described above, and the specific implementations described above are merely exemplary and not limitative. A person of ordinary skill in the art may make various variations under the teaching of the present application without departing from the spirit of the present application and the protection scope of the claims, and such variations shall all fall within the protection scope of the present application.

What is claimed is:

1. A discontinuous reception (DRX) configuration method, performed by a terminal device, the method comprising:

starting or restarting a first timer; and suspending running of the first timer in a case that a time unit corresponding to the first timer does not meet a first condition;

wherein the first condition comprises at least one of following that:

the time unit is a downlink time unit, wherein the downlink time unit comprises at least one of the following: a semi-static downlink time unit or a downlink time unit indicated by indication signaling in a subframe format;

the time unit is a flexible time unit;

there is a physical downlink control channel (PDCCH) monitoring occasion in the time unit; or there is a PDCCH monitoring occasion of a first search space or a first search space group in the time unit;

wherein the method further comprises:

determining a target start time of the first timer according to a start time offset rule;

wherein the start time offset rule is related to a first time range, and the first time range is related to an initial start time of the first timer;

wherein the determining the target start time of the first timer according to the start time offset rule comprises:

in a case that a second time unit in which the initial start time is located meets the first condition and/or a second condition, determining the initial start time as the target start time; and in a case that the second time unit in which the initial start time is located does not meet the first condition and/or the second condition, determining a start time of a third time unit as the target start time;

wherein the third time unit is the time unit that meets the first condition and/or the second condition within the first time range and is closest to the initial start time;

wherein the second condition is:

in the first timer started at the target start time, a ratio of a number of time units meeting the first condition to a total number of time units corresponding to the first timer is greater than or equal to a second ratio, and the second ratio is greater than 0 and less than 1.

2. The method according to claim 1, wherein the suspending running of the first timer in a case that the time unit corresponding to the first timer does not meet the first condition comprises:

in a case that a first time unit in which a start time or a restart time of the first timer is located does not meet the first condition, suspending running of the first timer; or in a case that an i-th time unit after the first time unit does not meet the first condition, suspending running of the first timer until an (i+m)-th time unit meets the first condition, wherein i and m are integers greater than or equal to 1.

3. The method according to claim 1, further comprising:

in a case that the time unit corresponding to the first timer meets the first condition, continuing to run the first timer.

4. The method according to claim 3, wherein the continuing to run the first timer in a case that the time unit corresponding to the first timer meets the first condition comprises:

in a case that a first time unit in which a start time or a restart time of the first timer is located meets the first condition, continuing to run the first timer;

and/or in a case that an i-th time unit after the first time unit meets the first condition, continuing to run the first timer until an (i+n)-th time unit does not meet the first condition, or until the first timer expires, wherein i and n are integers greater than or equal to 1.

5. The method according to claim 1, wherein a duration for which the first timer is suspended is one of following: an active time, a DRX active time, and an inactive time.

6. The method according to claim 1, wherein the first condition further comprises at least one of following that:

the time unit is an uplink time unit;

there is no synchronization signal and PBCH block (SSB) in the time unit;

there is an SSB in the time unit;

the time unit is a special time unit, a ratio of a number of downlink symbols in the special time unit to a total number of symbols in the special time unit is greater than a first ratio, and the first ratio is greater than 0 and less than 1;

there is no PDCCH monitoring occasion in the time unit;

there is no PDCCH monitoring occasion of the first search space or the first search space group in the time unit;

first downlink control information (DCI) is not received within the time unit;

the first DCI is received within the time unit;

a bandwidth part (BWP) activated in the time unit is a first BWP, and the first BWP is one of the following: a non-dormant BWP, a dormant BWP, a first activated BWP, and a default BWP;

the time unit is not a target time unit, and the target time unit corresponds to at least one of: a BWP switching delay, an interruption time caused by BWP switching, or a first application delay; or the time unit is the target time unit.

7. The method according to claim 1, wherein at least one of following is stipulated by the protocol or configured by the network-side device:

the first time range; wherein the first time range comprises N slots or subframes, and N is an integer greater than or equal to 0; or a default time range.

8. The method according to claim 1, wherein the method further comprises:

receiving second downlink control information (DCI), wherein the second DCI carries indication information of the start time offset rule.

9. The method according to claim 1, wherein before the determining a target start time of the first timer according to a start time offset rule, the method further comprises:

reporting a reference value of the first time range to the network-side device, wherein the reference value of the first time range is used to determine the first time range.

10. A network-side device, comprising: a memory, a processor, and programs or instructions stored in the memory and executable on the processor, wherein the programs or instructions, when executed by the processor, cause the network-side device to perform:

configuring a first timer; and sending configuration information, wherein the configuration information is used to instruct the terminal device to suspend running of the first timer in a case that a time unit corresponding to the first timer meets a first condition after the first timer is started or restarted;

wherein the first condition comprises at least one of following that:

the time unit is a downlink time unit, wherein the downlink time unit comprises at least one of the following: a semi-static downlink time unit or a downlink time unit indicated by indication signaling in a subframe format;

the time unit is a flexible time unit;

there is a physical downlink control channel (PDCCH) monitoring occasion in the time unit; or there is a PDCCH monitoring occasion of a first search space or a first search space group in the time unit;

wherein the method further comprises:

configuring a start time offset rule, wherein the start time offset rule is used to determine a target start time of the first timer, the start time offset rule is related to a first time range, and the first time range is related to an initial start time of the first timer; wherein in a case that a second time unit in which the initial start time is located meets the first condition and/or a second condition, the target start time is the initial start time; and in a case that the second time unit in which the initial start time is located does not meet the first condition and/or the second condition, the target start time is a start time of a third time unit;

wherein the third time unit is the time unit that meets the first condition and/or the second condition within the first time range and is closest to the initial start time;

wherein the second condition is:

in the first timer started at the target start time, a ratio of a number of time units meeting the first condition to a total number of time units corresponding to the first timer is greater than or equal to a second ratio, and the second ratio is greater than 0 and less than 1.

11. A terminal device, comprising: a memory, a processor, and programs or instructions stored in the memory and executable on the processor, wherein the programs or instructions, when executed by the processor, cause the terminal device to perform:

starting or restarting a first timer; and suspending running of the first timer in a case that a time unit corresponding to the first timer does not meet a first condition;

wherein the first condition comprises at least one of following that:

the time unit is a downlink time unit, wherein the downlink time unit comprises at least one of the following: a semi-static downlink time unit or a downlink time unit indicated by indication signaling in a subframe format;

the time unit is a flexible time unit;

there is a physical downlink control channel (PDCCH) monitoring occasion in the time unit; or there is a PDCCH monitoring occasion of a first search space or a first search space group in the time unit;

wherein the programs or instructions, when executed by the processor, cause the terminal device to further perform:

determining a target start time of the first timer according to a start time offset rule;

wherein the start time offset rule is related to a first time range, and the first time range is related to an initial start time of the first timer;

wherein the programs or instructions, when executed by the processor, cause the terminal device to perform:

in a case that a second time unit in which the initial start time is located meets the first condition and/or a second condition, determining the initial start time as the target start time; and in a case that the second time unit in which the initial start time is located does not meet the first condition and/or the second condition, determining a start time of a third time unit as the target start time;

wherein the third time unit is the time unit that meets the first condition and/or the second condition within the first time range and is closest to the initial start time;

wherein the second condition is:

in the first timer started at the target start time, a ratio of a number of time units meeting the first condition to a total number of time units corresponding to the first timer is greater than or equal to a second ratio, and the second ratio is greater than 0 and less than 1.

12. The terminal device according to claim 11, wherein the programs or instructions, when executed by the processor, cause the terminal device to perform:

in a case that a first time unit in which a start time or a restart time of the first timer is located does not meet the first condition, suspending running of the first timer; or in a case that an i-th time unit after the first time unit does not meet the first condition, suspending running of the first timer until an (i+m)-th time unit meets the first condition, wherein i and m are integers greater than or equal to 1.

13. The terminal device according to claim 11, wherein the programs or instructions, when executed by the processor, cause the terminal device to further perform:

in a case that the time unit corresponding to the first timer meets the first condition, continuing to run the first timer.

14. The terminal device according to claim 13, wherein the programs or instructions, when executed by the processor, cause the terminal device to perform:

in a case that a first time unit in which a start time or a restart time of the first timer is located meets the first condition, continuing to run the first timer;

and/or in a case that an i-th time unit after the first time unit meets the first condition, continuing to run the first timer until an (i+n)-th time unit does not meet the first condition, or until the first timer expires, wherein i and n are integers greater than or equal to 1.

15. The terminal device according to claim 11, wherein a duration for which the first timer is suspended is one of following: an active time, a DRX active time, and an inactive time.

16. The terminal device according to claim 11, wherein the first condition further comprises at least one of following that:

the time unit is an uplink time unit;

there is no synchronization signal and PBCH block (SSB) in the time unit;

there is an SSB in the time unit;

the time unit is a special time unit, a ratio of a number of downlink symbols in the special time unit to a total number of symbols in the special time unit is greater than a first ratio, and the first ratio is greater than 0 and less than 1;

there is no PDCCH monitoring occasion in the time unit;

there is no PDCCH monitoring occasion of the first search space or the first search space group in the time unit;

first downlink control information (DCI) is not received within the time unit;

the first DCI is received within the time unit;

a bandwidth part (BWP) activated in the time unit is a first BWP, and the first BWP is one of the following: a non-dormant BWP, a dormant BWP, a first activated BWP, and a default BWP;

the time unit is not a target time unit, and the target time unit corresponds to at least one of: a BWP switching delay, an interruption time caused by BWP switching, or a first application delay; or the time unit is the target time unit.

17. The terminal device according to claim 11, wherein at least one of following is stipulated by the protocol or configured by the network-side device:

the first time range; wherein the first time range comprises N slots or subframes, and N is an integer greater than or equal to 0; or a default time range.

18. The terminal device according to claim 11, wherein the programs or instructions, when executed by the processor, cause the terminal device to further perform:

receiving second downlink control information (DCI), wherein the second DCI carries indication information of the start time offset rule.

19. The terminal device according to claim 11, wherein the programs or instructions, when executed by the processor, cause the terminal device to further perform:

reporting a reference value of the first time range to the network-side device, wherein the reference value of the first time range is used to determine the first time range.

* * * * *